(12) United States Patent
Shirai et al.

(10) Patent No.: US 8,016,486 B2
(45) Date of Patent: Sep. 13, 2011

(54) ROLLING GUIDING DEVICE

(75) Inventors: Takeki Shirai, Tokyo (JP); Katsuhito Imai, Tokyo (JP); Shinji Izumi, Tokyo (JP); Yuji Tachikake, Tokyo (JP)

(73) Assignee: THK Co., Ltd., Tokyo (JP)

( * ) Notice: Subject to any disclaimer, the term of this patent is extended or adjusted under 35 U.S.C. 154(b) by 830 days.

(21) Appl. No.: 11/660,412

(22) PCT Filed: Aug. 23, 2005

(86) PCT No.: PCT/JP2005/015241
§ 371 (c)(1),
(2), (4) Date: Aug. 10, 2007

(87) PCT Pub. No.: WO2006/022242
PCT Pub. Date: Mar. 2, 2006

(65) Prior Publication Data
US 2008/0112656 A1    May 15, 2008

(30) Foreign Application Priority Data

Aug. 27, 2004  (JP) ................................. 2004-247961
Jun. 30, 2005  (JP) ................................. 2005-191972

(51) Int. Cl.
*F16C 29/06* (2006.01)
(52) U.S. Cl. ................. 384/45; 384/43; 384/49
(58) Field of Classification Search .................. 384/15, 384/40, 43–45, 49, 51
See application file for complete search history.

(56) References Cited

U.S. PATENT DOCUMENTS

| | | | |
|---|---|---|---|
| 3,758,176 A * | 9/1973 | Stapley | 384/44 |
| 3,845,993 A * | 11/1974 | Schiler | 384/45 |
| 3,938,854 A * | 2/1976 | Teramachi | 384/45 |
| 4,025,128 A * | 5/1977 | Geffner | 384/43 |
| 4,030,191 A * | 6/1977 | Ernst et al. | 384/45 |
| 4,496,197 A * | 1/1985 | Kwon | 384/44 |
| 4,695,170 A * | 9/1987 | Teramachi | 384/45 |

(Continued)

FOREIGN PATENT DOCUMENTS

DE    3422444 A1 *  12/1985

(Continued)

OTHER PUBLICATIONS

International Search Report of PCT/JP2005/015241, date of mailing Dec. 13, 2005.

(Continued)

*Primary Examiner* — Marcus Charles
(74) *Attorney, Agent, or Firm* — Westerman, Hattori, Daniels & Adrian, LLP

(57) ABSTRACT

A rolling guiding device makes it possible to easily provide a movement block with an endless circulation path for the balls. In one surface of a movement block opposed to a rolling groove of a raceway rail, there is formed a track groove through which balls makes an endless circulation. The track groove is includes a load straight-line groove which allows, between the track groove and the rolling groove of the raceway rail, the balls to roll while bearing a load. It also includes a pair of ball deflection grooves respectively provided at both ends of the load straight-line groove and adapted to release the balls having rolled through the straight-line groove from the load and to change their rolling direction, and a non-load straight-line groove for transferring the ball in a non-load state from one deflection groove to the other ball deflection groove.

10 Claims, 6 Drawing Sheets

U.S. PATENT DOCUMENTS

| | | | | |
|---|---|---|---|---|
| 4,798,479 | A | * | 1/1989 | Morita ..................... 384/45 |
| 4,921,361 | A | * | 5/1990 | Steeves ..................... 384/45 |
| 4,941,197 | A | * | 7/1990 | Roeser ..................... 384/15 |

FOREIGN PATENT DOCUMENTS

| | | | | |
|---|---|---|---|---|
| EP | 483384 | A1 | * | 5/1992 |
| GB | 1302026 | A | | 1/1973 |
| JP | 55-159321 | A | | 12/1980 |
| JP | 60-39892 | B2 | | 9/1985 |
| JP | 63007244 | A | * | 1/1988 |
| JP | 2-25723 | U | | 2/1990 |
| JP | 25723/1990 | U | | 2/1990 |
| JP | 04025618 | A | * | 1/1992 |
| JP | 4-56215 | U | | 5/1992 |
| JP | 56215/1992 | U | | 5/1992 |
| JP | 4-53459 | Y2 | | 12/1992 |
| JP | 10-009264 | A | | 1/1998 |
| JP | 10131964 | A | * | 5/1998 |
| JP | 2001-227540 | A | | 8/2001 |
| JP | 2003-120669 | A | | 4/2003 |
| JP | 2006105262 | A | * | 4/2006 |
| WO | WO 9821494 | A1 | * | 5/1998 |
| WO | 2007/004488 | A1 | | 1/2007 |

OTHER PUBLICATIONS

European Search Report dated Feb. 5, 2009, issued in corresponding European Patent Application No. 05780874.3.

Translation of the International Preliminary Report on Patentability of International Application No. PCT/JP 2005/015241, with Form PCT/IPEA/409.

* cited by examiner

ROLLING GUIDING DEVICE

TECHNICAL FIELD

The present invention relates to a rolling guiding device in which a raceway rail and a movement block are assembled to each other through an intermediation of a large number of balls, enabling a mounted object fixed to the movement block to freely make a reciprocating movement along the raceway rail, and more particularly, to a rolling guiding device in which the movement block is equipped with an endless circulation path for the balls, enabling the movement block to move continuously along the raceway rail while causing the balls to make an endless circulation.

BACKGROUND ART

In a linear guiding portion of a work table of a machine tool or any one of various conveying devices, there is widely used a rolling guiding device in which a movement block with a movable member such as a table mounted thereon moves continuously along a raceway rail. In a rolling guiding device of this type, the movement block is assembled to the raceway rail through the intermediation of a large number of balls, and the balls roll along while bearing a load between the movement block and the raceway rail, whereby it is possible for the movable member mounted on the movement block to make a smooth movement along the raceway rail while involving very little resistance. The movement block is equipped with an endless circulation path for the balls, and the balls are caused to circulate within this endless circulation path, whereby it is possible for the movement block to move continuously along the raceway rail.

The raceway rail has a ball rolling groove extending in the longitudinal direction, and the movement block has a load rolling groove opposed to the ball rolling groove of the raceway rail, so a load rolling path for the balls is formed by the ball rolling groove on the raceway rail side and the load rolling groove on the movement block side. That is, the balls are held in contact with the ball rolling groove on the raceway rail side and the load rolling groove on the movement block side, and roll along while bearing a load exerted therebetween. Further, the movement block has a non-load rolling path which is parallel to the load rolling path, and both ends of this non-load rolling path are communication-connected with the load rolling path by a pair of direction changing paths formed in an arcuate configuration. The balls are released from the load at an end of the load rolling path, and are detached from the ball rolling groove of the raceway rail to enter one of the direction changing paths, from which the balls roll toward the non-load rolling path. The balls having rolled through the non-load rolling path are returned to the ball rolling groove of the raceway rail by way of the direction changing path on the opposite side before rolling through the load rolling path again while bearing the load. In this way, the movement block is equipped with an endless circulation path for the balls in which the load rolling path, one direction changing path, the non-load rolling path, and the other direction changing path are successively connected; while circulating through this endless circulation path, the balls are alternately placed in a loaded state and an unloaded state, whereby the movement block can move continuously along the raceway rail without involving any limitations in terms of stroke.

The movement block is composed of a block main body formed of a steel allowing quenching, and a pair of end caps of a synthetic resin fixed to the front and rear end surfaces of the block main body; the load rolling groove is formed in the block main body by grinding, whereas the non-load rolling path is formed by forming in the block main body a through-hole of an inner diameter larger than the diameter of the balls and parallel to the load rolling groove, thus forming a tunnel-like non-load rolling path. The direction changing paths are formed in the end caps; by fixing the end caps respectively to the front and rear end surfaces of the block main body, the end portions of the load rolling path and the end portions of the non-load rolling path are connected by the direction changing paths, thereby forming an endless circulation path for the balls (JP 10-009264 A, Japanese Utility Model Publication No. 4-53459, etc.).

Patent Document 1: JP 10-009264 A
Patent Document 2: JP 4-53459 A
Patent Document 3: JP 2001-227540 A

DISCLOSURE OF THE INVENTION

Problems to be Solved by the Invention

However, in the endless circulation path construction applied to the above-mentioned conventional rolling guiding device, there are problems in that many machining steps and components are required in order to provide the movement block with the non-load rolling path, the direction changing paths, etc., so the production of the movement block requires time and effort and thus involves a rather high production cost, and in that it is rather difficult to cause the balls to circulate smoothly within the endless circulation path due to machining errors and assembly errors of the components constituting the movement block, and the balls are liable to get caught during circulation, resulting in generation of noise.

Further, in recent years, the use of a rolling guiding device of this type is not restricted to the field of machine tools or the like but has been extended the field of general industry machinery, and further, to the field of everyday items produced and marketed in large quantities; thus, for example, there is a demand for an ultra-small rolling guiding device using balls of a diameter of 1 mm or less as the rolling members. Thus, with the method in which, in order to provide the movement block with an endless circulation path, a through-hole constituting the non-load rolling path is formed in the block main body or in which end caps with direction changing paths formed therein are fixed to the block main body, it is rather difficult to produce easily and at low cost such a small-sized rolling guiding device using balls of a diameter of 1 mm or less.

In the rolling guiding device disclosed in JP 2001-227540 A, an attempt is made to easily form the non-load rolling path in the movement block by forming opposing grooves respectively in the movement block and the raceway rail, forming the non-load rolling path for the balls by those grooves. However, as in the prior art, the direction changing paths for transferring the balls from the load rolling path to the non-load rolling path are formed in the end caps, so it is necessary to accurately perform positioning on the end caps with respect to the movement block. Thus, in a case in which the ball diameter is 1 mm or less, the assembly of the movement block is rather difficult to perform.

Means for Solving the Problems

The present invention has been made in view of the problems described above in the prior art. It is therefore an object of the present invention to provide a rolling guiding device which makes it possible to easily provide the movement block with the endless circulation path for the balls even in a case of a small-sized rolling guiding device using balls of a relatively small diameter and which can be produced easily and at low cost.

To achieve the object described above, a rolling guiding device according to the present invention includes a raceway rail and a movement block assembled to the raceway rail through the intermediation of a large number of balls, in which in at least one surface of the raceway rail opposed to the movement block, there is formed a ball rolling groove extending in the longitudinal direction of the raceway rail, and in one surface of the movement block opposed to the rolling groove, there is formed a track groove through which the balls make a circulation. The endless track groove is composed of: a load straight-line groove which allows, between itself and the rolling groove of the raceway rail, the balls to roll along while bearing a load; a pair of ball deflection grooves respectively provided at both ends of the load straight-line groove and adapted to release the balls having rolled through the load straight-line groove from the load and to change their rolling direction, causing the balls to leave the rolling groove of the raceway rail; and a non-load straight-line groove for transferring the balls in a non-load state from one ball deflection groove to the other ball deflection groove.

In this rolling guiding device, solely by forming the track groove in one surface of the movement block opposed to the ball rolling groove of the raceway rail, it is possible to transfer the balls to the rolling groove of the raceway rail, and further, to detach them from the rolling groove to thereby cause them to make an endless circulation, making it possible to move the movement block continuously along the raceway rail. That is, in providing the movement block with the endless circulation path for the balls, there is no need to form a through-hole constituting the non-load rolling path in the movement block; nor is it necessary to fix end caps equipped with ball direction changing paths to both ends of the movement block. Thus, it is possible to form very easily and at low cost a movement block equipped with an endless circulation path for the balls.

Further, the track groove can be formed in the movement block by a single cutting step using an end mill or the like, and the machining can be easily performed through numerical control of the machining apparatus while freely adjusting the depths of the load straight-line groove, the non-load straight-line groove, and the ball deflection grooves constituting the track groove. Thus, the endless circulation path for the balls can be provided very easily in the movement block.

Further, instead of performing cutting, the above-mentioned track groove can be directly provided in the movement block when forming the movement block by casting, metal injection molding (MIM), etc. using a die; by forming the movement block by those methods, it is possible to produce movement blocks each equipped with an endless circulation path for balls in great quantities and at low cost.

BEST MODE FOR CARRYING OUT THE INVENTION

In the following, the rolling guiding device of the present invention will be described in detail with reference to the accompanying drawings.

Figure 1:
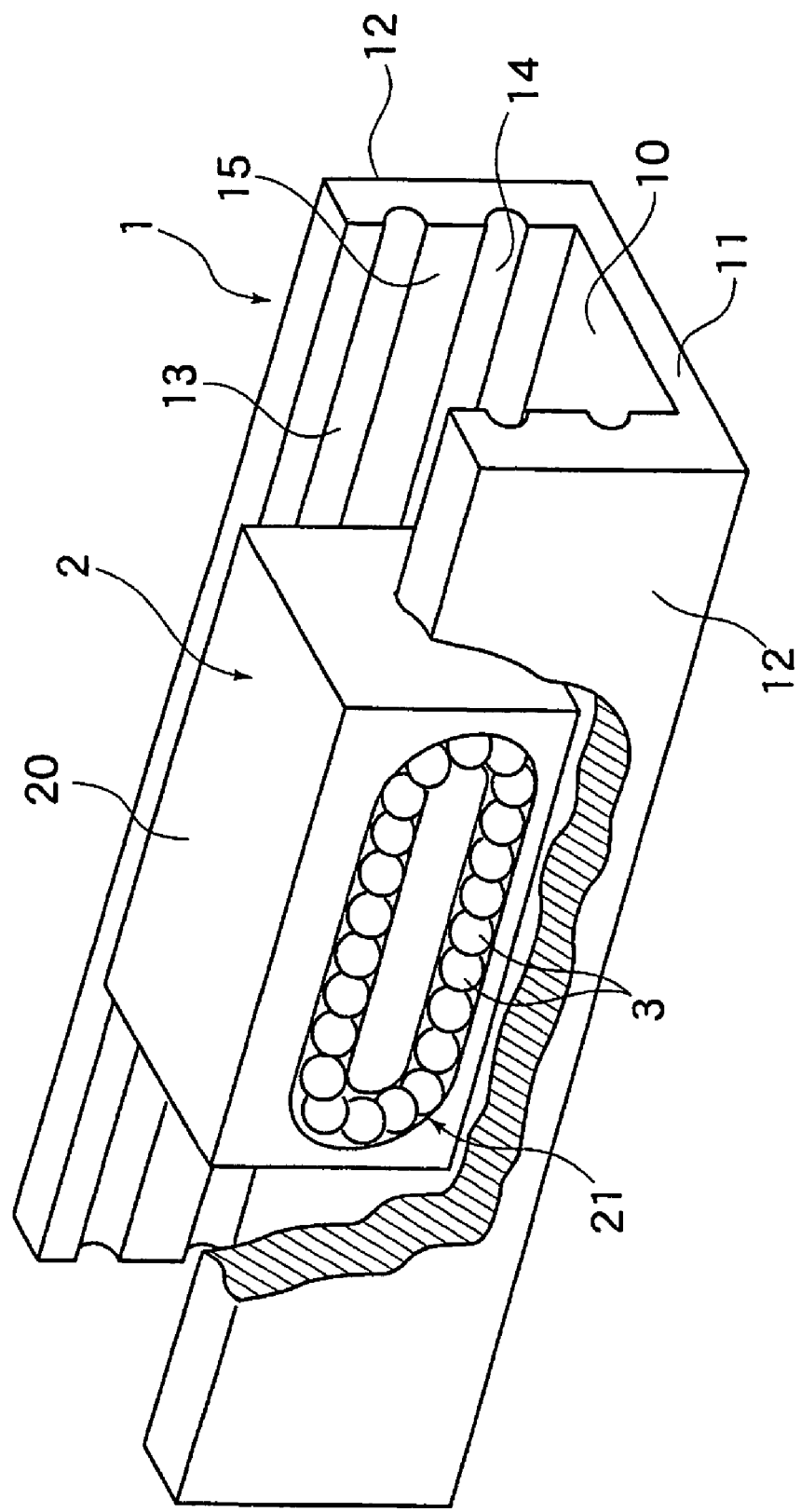
FIG. 1 is a partially cutaway perspective view of a first embodiment of a rolling guiding device to which the present invention is applied.
Figure 2:
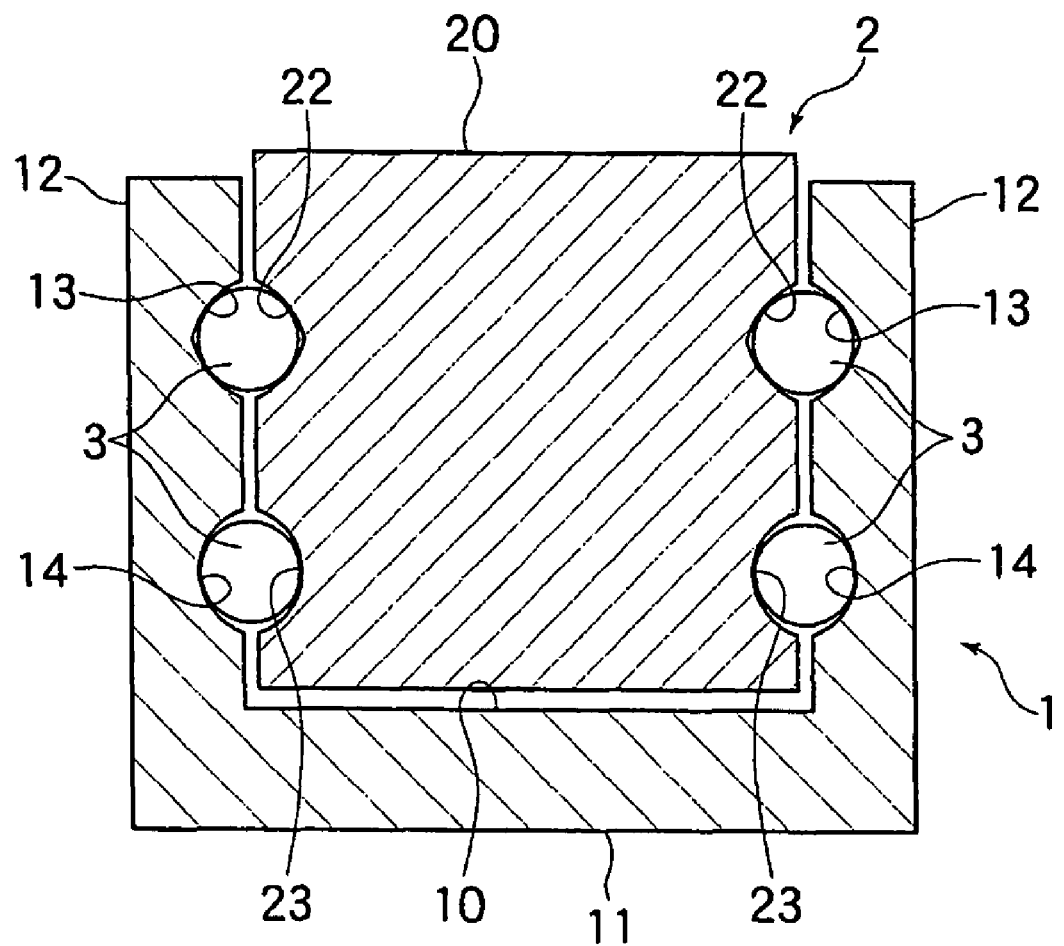
FIG. 2 is a front sectional view of the rolling guiding device shown in FIG. 1.

FIGS. 1 and 2 show a first embodiment of a rolling guiding device to which the present invention is applied. The rolling guiding device of the first embodiment is composed of a raceway rail 1 formed in a channel-like configuration having an accommodation groove 10 extending continuously in the longitudinal direction, and a movement block 2 assembled into the accommodation groove 10 of the raceway rail 1 through the intermediation of a large number of balls 3, with the movement block 2 freely reciprocating within the accommodation groove 10 of the raceway rail 1.

The raceway rail 1 is equipped with a base portion 11 to be fixed to mounting portions of various types of apparatuses, and a pair of side wall portions 12 and 12 provided so as to be erect on both sides of the base portion 11; between the side wall portions 12 and 12 opposed to each other, there is formed the accommodation groove 10, constituting the path for the movement block 2. In the inner side surface of each side wall portion 12 facing the accommodation groove 10, there are formed a rolling groove 13 for the balls 3 extending in the longitudinal direction (direction perpendicular to the plane of FIG. 2), and a non-load ball groove 14 situated below the ball rolling groove 13 and extending parallel to the ball rolling groove 13. The ball rolling groove 13 and the non-load ball groove 14 are separated from each other by a flat portion 15. Further, although not shown, a plurality of tap holes are formed in the base portion 11 of the raceway rail 1; by threadedly engaging fixing screws with those tap holes, it is possible to fix the raceway rail 1 to the mounting portions of various types of apparatuses.

The movement block 2 is formed in a rectangular configuration; as shown in FIG. 2, it is loosely fitted into the accommodation groove 10 of the raceway rail 1 while maintaining a slight gap between the base portion 11 and the side wall portions 12 of the raceway rail 1. The movement block 2 slightly protrudes upwards beyond the accommodation groove 10 of the raceway rail 1, and the upper surface of the movement block 2 constitutes a mounting surface 20 for a movable member, such as a table. Further, although not shown, it is possible to form in the upper surface 20 of the movement block 2 tap holes with which mounting screws are to be threadedly engaged.

Figure 3:
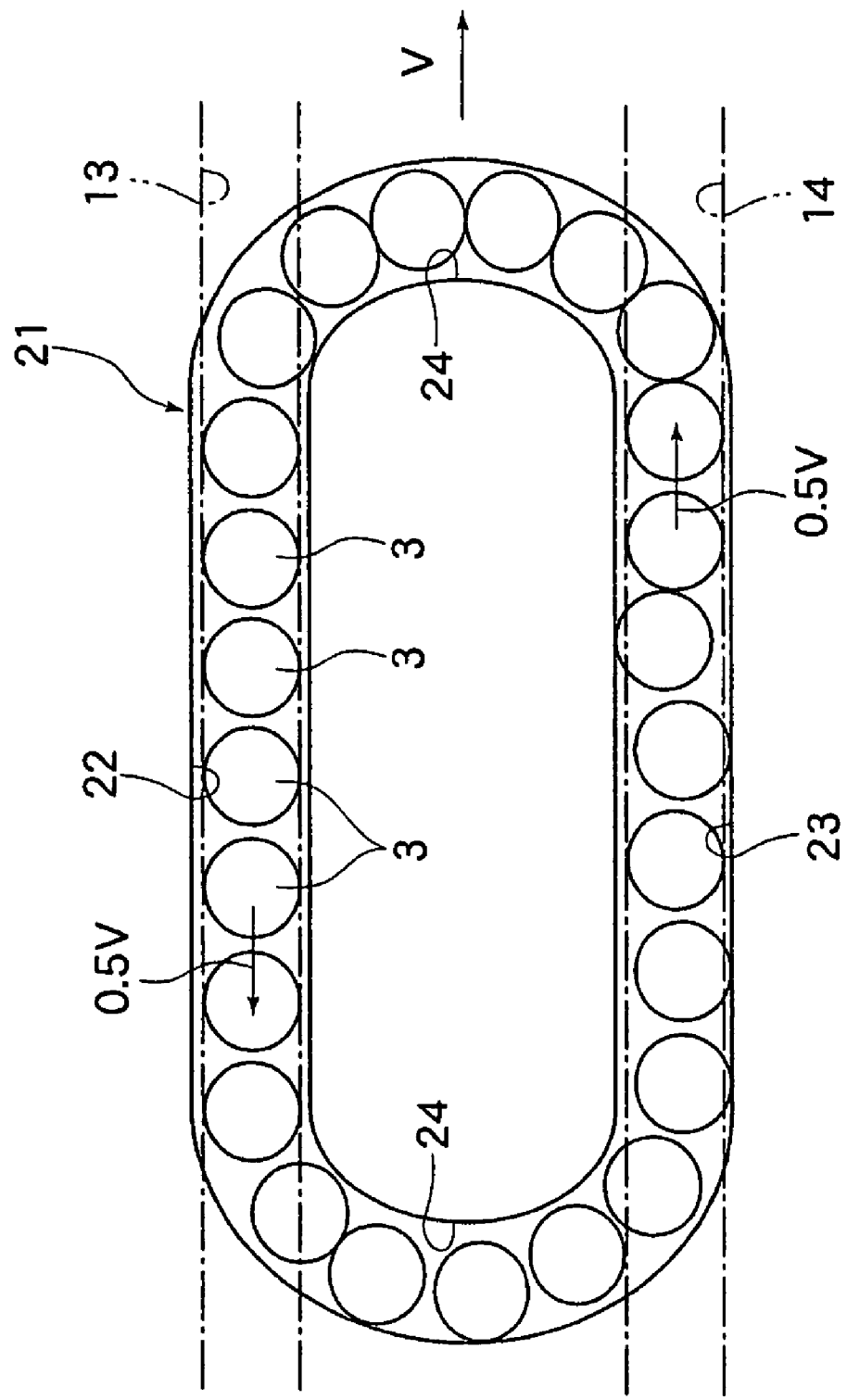
FIG. 3 is an enlarged view of a track groove of a movement block of the rolling guiding device shown in FIG. 1.

As shown in FIG. 1, a track groove 21 accommodating a large number of balls 3 is formed in each of the side surfaces of the movement block 2 opposed to the flange portions 12 of the raceway rail 1 through the intermediation of slight gaps. As shown in FIG. 3, each track groove 21 is composed of a load straight-line groove 22 opposed to the ball rolling groove 13 of the raceway rail 1, a non-load straight-line groove 23 formed to extend parallel to the load straight-line groove 22 and opposed to the non-load ball groove 14 of the raceway groove 1, and ball deflection grooves 24 and 24 allowing passage of the balls between the load straight-line groove 22 and the non-load straight-line groove 23. The balls 3 roll along while bearing a load between the ball rolling grooves 13 of the raceway rail 1 and the load straight-line grooves 22 of the movement block 2, whereby the movement block 2 can freely reciprocate along the raceway rail 1. That is, load rolling paths for the balls 3 are formed by the ball rolling grooves 13 of the raceway rail 1 and the non-load straight-line grooves 22 of the movement block 2 respectively opposed to each other.

Figure 4:
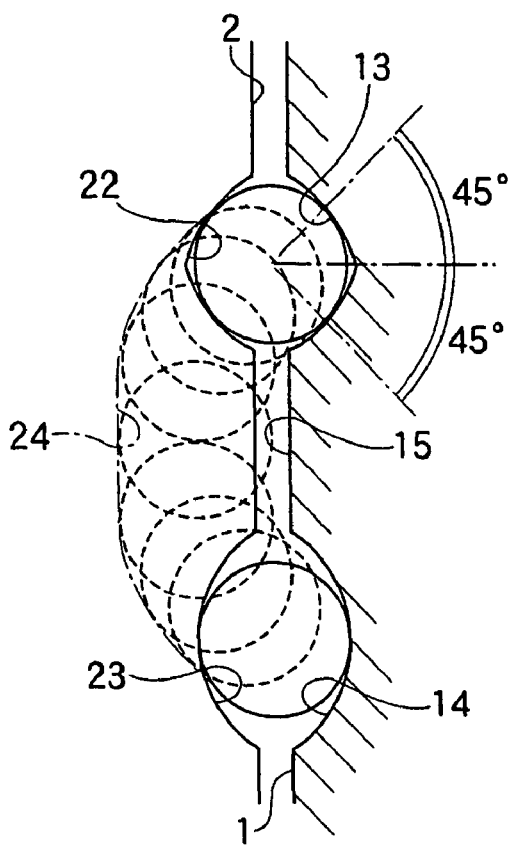
FIG. 4 is an enlarged sectional view showing how a ball moves in a ball deflection groove in the track groove.

As shown in FIG. 4, the ball rolling grooves 13 of the raceway rail 1 and the load straight-line grooves 22 of the track grooves 21, opposed thereto, are formed in a Gothic-arch-like sectional configuration, and the balls 3 are in two-point contact with the grooves 13 and 22. The directions in which each ball 3 is held in contact with the ball rolling groove 13 and the load straight-line groove 22 are respectively inclined upward and downward by 45 degrees with respect to the direction of the normal on the inner side surface of the flange portion 12 (horizontal direction in FIG. 4), making it possible to bear all the load acting on the movement block 2 in the directions other than the moving direction thereof.

On the other hand, the non-load ball grooves 14 of the raceway rail 1 and the non-load straight-line grooves 23 of the track grooves 21, opposed thereto, are formed as circular arc grooves whose sectional configuration is of a curvature smaller than the curvature of the spherical surfaces of the balls 3. The distance between the non-load ball grooves 14 on the raceway rail 1 side and the non-load straight-line grooves 23 on the movement block side 2 is set to be slightly larger than the diameter of the balls 3 accommodated in the track grooves 21, leaving slight gaps between the balls 3 and the raceway rail 1 and between the balls 3 and the movement block 2. If the ball rolling grooves 13 and the non-load ball grooves 14 of the raceway rail 1, and the load straight-line grooves 22 and the non-load straight line grooves 23 of the movement block 2, are formed in the same depth, slight gaps are generated between the balls 3 and the non-load ball grooves 14 and the non-load straight-line grooves 23 since the ball rolling grooves 13 and the load straight-line grooves 23 are formed in a Gothic-arch-like sectional configuration, while the non-load ball grooves 14 and the non-load straight-line grooves 23 are formed in a circular-arc-like sectional configuration. That is, the non-load ball grooves 14 of the raceway rail 1 and the non-load straight-line grooves 23 of the movement block 2 are opposed to each other to form non-load rolling paths for the balls 3.

The ball deflection grooves 24 have substantially U-shaped raceways connecting the load straight-line grooves 22 and the non-load straight-line grooves 23; the U-shaped raceways release the balls 3, having rolled through the load straight-line grooves 22 while bearing a load, from the load, and gradually change the direction in which the balls 3 roll, sending them into the non-load straight-line grooves 23 after direction change by 180 degrees. The ball deflection grooves 24 are formed so as to be shallowest at the positions where they are connected to the load straight-line grooves 22 and deepest at the positions where they are opposed to the flat portions 15 of the raceway rail 1. Due to the gradual deepening of the ball deflection grooves 24, the balls 3 having rolled through the load straight-line grooves 22 are released from the load upon entering the ball deflection grooves 24, and advance through the ball deflection grooves 24 in a non-load state toward the non-load straight-line grooves 23. As the ball deflection grooves 24 approach the non-load straight-line grooves 23, they become gradually shallower, and the balls 3 enter the non-load straight-line grooves 23 while maintaining the non-load state.

When the movement block 2 is moved along the raceway rail 1, the balls 3 held between the rolling grooves 13 of the raceway rail 1 and the load straight-line grooves 22 of the movement block 2, that is, the balls 3 bearing the load within the load rolling paths move within the load straight-line grooves 22 at a speed of 0.5 V, which is half a speed V at which the movement block 2 moves relative to the raceway rail 1. Since the sectional configuration of the grooves changes gradually from the Gothic-arch-like one to the circular-arc-like one, the balls 3 rolling through the load straight-line grooves 22 are gradually released from the load upon reaching the ball deflection grooves 30. The balls 3 released from the load advance as they are through the rolling grooves 13 of the raceway rail 1 while pushed by the succeeding balls 3; since the ball deflection grooves 30 interrupt the rolling of the balls in the rolling grooves 13 and forcibly change the advancing direction of the balls 3, the balls 3 are moved sidewise within the rolling grooves 13 by the ball deflection grooves 30, and climb up the rolling grooves 13 to be raised to the flat portions 15 of the raceway rail 1. As a result, the balls 3 leave the rolling grooves 13 of the raceway rail 1, and are completely accommodated in the ball deflection grooves 24 of the movement block 2.

Since the ball deflection grooves 24 have substantially U-shaped raceways, the balls 3 accommodated in the ball deflection grooves 24 are reversed in their rolling direction, and enter the non-load rolling paths formed by the non-load rolling grooves 14 of the raceway rail 1 and the non-load straight-line grooves 23 of the movement block 2 respectively opposed to each other. In this process, the balls 3 enter the non-load rolling paths while climbing down sidewise the non-load ball grooves 14 of the raceway rail 1. As stated above, the distance between the non-load ball grooves 14 of the raceway rail 1 and the non-load straight-line grooves 23 of the movement block 2 is set to be slightly larger than the diameter of the balls 3, so the balls 3 are brought into the non-load state within the non-load rolling paths, and advance through the non-load paths while pressed by the succeeding balls 3.

Further, upon reaching positions where the non-load straight-line grooves 23 and the ball deflection grooves 24 are connected, the balls 3 having advanced through the non-load rolling paths are moved sidewise within the non-load ball grooves 14 of the raceway rail 1 by the ball deflection grooves 24, so the balls 3 climb up the non-load ball grooves 14 to be raised to the flat portions 15 of the raceway rail 1, and are completely accommodated in the ball deflection grooves 24 of the movement block 2. Then, the balls 3 accommodated in the ball deflection grooves 24 are again reversed in their rolling direction, and enter the non-load rolling paths formed by the ball rolling grooves 13 of the raceway rail 1 and the non-load straight-line grooves 22 of the movement block 2 respectively opposed to each other. In this process, the balls 3 are guided by the ball deflection grooves 24, and climb down the ball rolling grooves 13 of the raceway rail 1 sidewise to enter the load rolling paths; as the groove sectional configuration gradually changes from the circular-arc-like one to the Gothic-arch-like one at the positions where the ball deflection grooves 24 and the load straight-line grooves 22 are connected together, they are changed from the non-load state to the load state.

In this way, the balls 3 circulate through the track grooves 21 of the movement block 2, and with this circulation, the movement block 2 can move incessantly and continuously along the raceway rail 1.

In the rolling guiding device of this embodiment, constructed as described above, the track grooves 21 are formed in the outer side surfaces of the movement block 2 opposed to the surfaces of the raceway rail 1 where the ball rolling grooves 13 are formed, that is, the inner side surfaces of the flange portions 12, and the endless circulation paths for the balls 3 are formed by the track grooves 21, so the construction of the movement block 2 is very simple. Further, the entering and leaving of the balls 3 with respect to the ball rolling grooves 13 of the raceway rail is effected solely by the ball deflection grooves 24 formed in the track grooves 21, and no other members are required. The track grooves 21, inclusive of the ball deflection grooves 24, can be easily formed in the outer side surfaces of the movement block 2 by milling using an end mill, etc.; for example, the load straight-line grooves 22 can be shaped by using a forming mill in conformity with the Gothic-arch-like sectional configuration. On the other hand, the ball deflection grooves 24 and the non-load straight-line grooves 23 of the circular-arc-like sectional configuration can be formed by using a ball end mill. Further, the depths of the load straight-line grooves 22, the ball deflection grooves 24, and the non-load straight-line grooves 23 can be adjusted with high precision through numerical control of the machining apparatus; regarding the ball deflection grooves 30 also, they can be freely formed in a depth and configuration that sufficiently allow detachment of the balls 3 from the ball rolling grooves 13 of the raceway rail 1.

Figure 8:
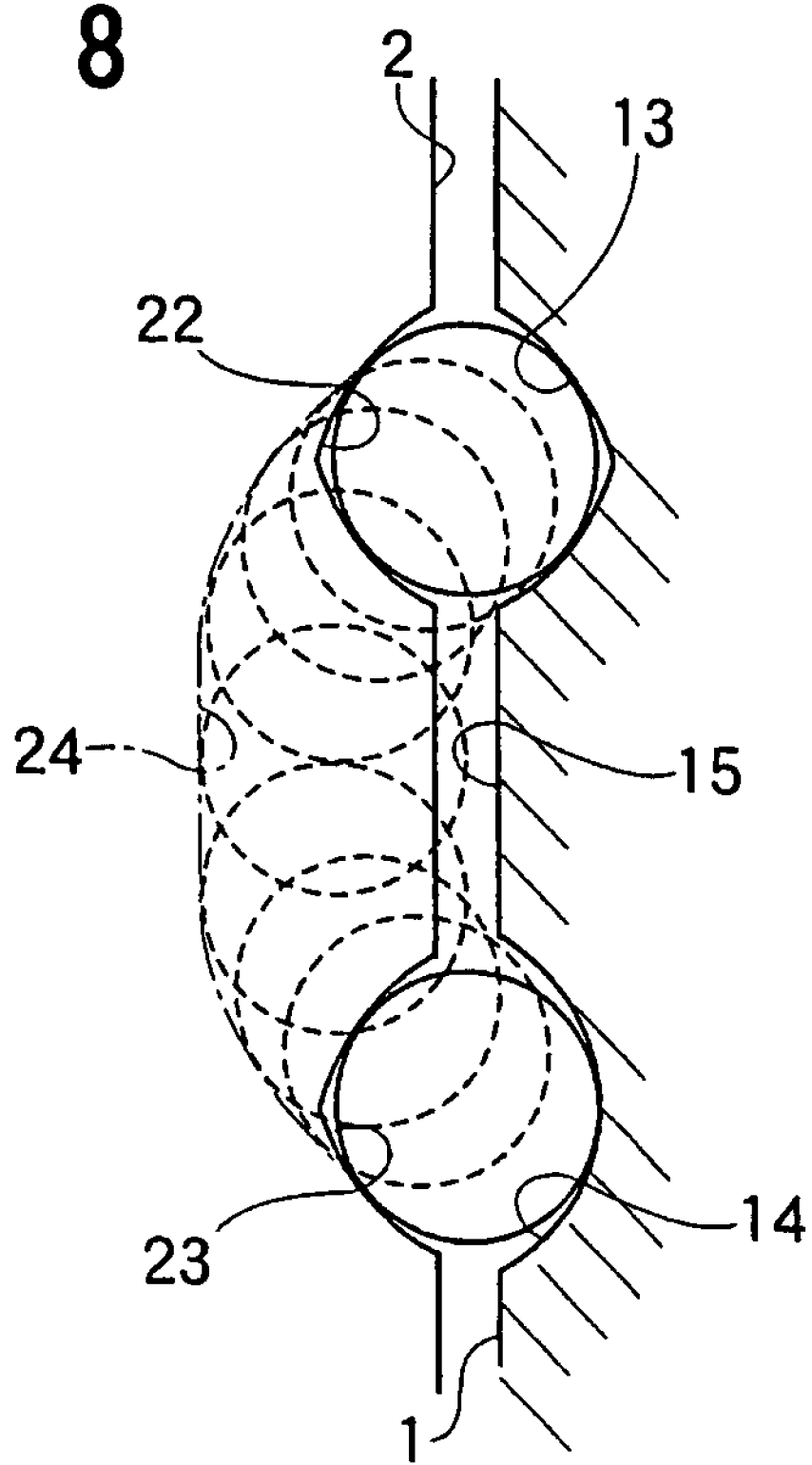
FIG. 8 is an enlarged sectional view of how a ball moves in a direction changing path in the track groove in a case in which the non-load straight-line groove and the direction changing groove are formed in a Gothic-arch-like sectional configuration.

Further, it is also possible to continuously form the load straight-line grooves 22, the ball deflection grooves 24, and the non-load straight-line grooves 23 by using a single end mill. That is, the track grooves 21 can be formed in a single stroke in the side surfaces of the movement block 2. As shown in FIG. 8, in this case, the non-load straight-line grooves 23 and the ball deflection grooves 24 are formed not in a circular-arc-like sectional configuration but in a Gothic-arch-like sectional configuration like the non-load straight-line grooves 22. In a case in which the non-load straight-line grooves 23 and the ball deflection grooves 24 are thus formed in a Gothic-arch-like sectional configuration, in order to prevent application of a load to the balls 3 within the non-load rolling paths, it is necessary to form the non-load straight-line grooves 23 and the ball deflection grooves 24 deeper than in a case in which they are formed in a circular-arc-like sectional configuration, and to generate gaps between the balls 3 and the non-load ball grooves 14 of the raceway rail 1. By thus continuously forming the track grooves 21 by using a single end mill, it is possible to provide the movement block 2 with the track grooves 21 more easily.

The movement block 2 of the embodiment shown in FIG. 1 is formed in a rectangular configuration, and the track grooves 21 and 21 are formed in a pair of opposing outer side surfaces thereof; thus, it is also possible, for example, to machine the pair of track grooves 21 and 21 simultaneously, using the mounting surface 20 for the movable member as the machining reference surface, thus making it possible to machine the movement block 2 very easily.

Further, there is no need to fix separate components for forming the endless circulation paths for the balls 3, such as end caps, to the movement block 2, so there is no need to control the machining precision and mounting precision for such components. Thus, the present invention proves very useful in producing a small-sized rolling guiding device, such as one using balls of a diameter, for example, of 1 mm or less.

Further, in the rolling guiding device of the present invention, it is also possible to form the movement block 2 by casting using a die, providing the movement block 2 with the track grooves 21 simultaneously with the casting. In particular, in a case in which the movement block 2 is formed by casting of an amorphous metal, such an amorphous metal has an overcooled liquid region, so there is no need to take solidification shrinkage into consideration, thus making it possible to attain superior dimensional precision and to reproduce the surface condition of the die with high accuracy. Further, since the metal used is amorphous, its surface is smoother than that of an ordinary metal having crystalline structure; further, it helps to easily attain a hardness of Hv 500 or more, thus providing superior wear resistance. Thus, by forming the movement block 2 by casting using such an amorphous metal, and providing the movement block 2 with the track grooves 21 by such casting, it is possible to complete the movement block 2 by this casting process alone, thus enabling the rolling guiding device to be produced at a very low cost.

Similarly, it is also possible to form the movement block by metal injection molding (MIM), providing the movement block 2 with the track grooves 21 simultaneously with the injection molding.

While in the example shown in FIG. 1 the non-load ball grooves 14 are formed in the raceway rail 1, and the non-load rolling paths for the balls 3 are formed by the non-load ball grooves 14 on the raceway rail 1 side and the non-load straight-line grooves 23 on the movement block 2 side opposed to each other, it is also possible to omit the non-load ball grooves 14 on the raceway rail 1 side. That is, as shown in FIG. 5, it is also possible to form the non-load straight-line grooves 23 constituting the track grooves 21 as grooves continuous from the deepest portions of the ball deflection grooves 24, forming the non-load rolling paths by the non-load straight-line grooves 23 and the inner side surfaces of the flange portions 12 of the raceway rail opposed to each other.

However, when no non-load ball grooves 14 are formed on the raceway rail 1 side, but the non-load straight-line grooves 23 of the track grooves 21 are caused to face flat surfaces, the balls 3 advancing through the non-load straight-line grooves 23 are held in point contact with the raceway rail 1, so, even when the balls 3 in the track grooves 21 are lubricated with lubricating oil supplied thereto, the lubricating oil film is likely to become discontinuous between the balls 3 advancing through the non-load straight-line grooves 23 and the raceway rail 1, so there is a fear of the balls 3 and the raceway rail 1 being brought into solid contact with each other. Further, assuming that the moving speed of the movement block 2 with respect to the raceway rail 1 is V, the balls 3 in the non-load straight-line grooves 23 are advancing in the same direction as the moving block 2 at a speed of 0.5 V with respect to the movement block 2, which means they are moving in the same direction as the movement block 2 at a speed of 1.5 V with respect to the raceway rail 1. Thus, in a case in which the speed V of the movement block 2 is set high, when the oil film between the balls 3 and the raceway rail 1 becomes discontinuous, there is a fear of the balls 3 suffering seizure and partial wear.

Figure 5:
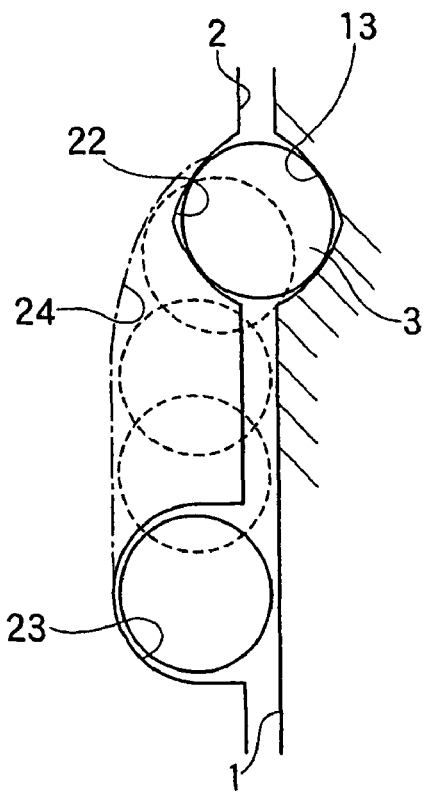
FIG. 5 is an enlarged sectional view of an example of a construction in which a flat surface of a raceway rail is opposed to a non-load straight-line groove of the track groove.

When, as in the embodiment shown in FIGS. 1 through 4, the non-load ball grooves 14 are formed in the raceway rail 1, the balls 3 advancing through the non-load straight-line grooves 23 of the track grooves 21 advance within the non-load ball grooves 14 on the raceway rail 1 side, so the balls 3 are enclosed in the circular-arc-like grooves from the raceway rail 1 side and the movement block 2 side, and the contact surface pressure between the balls 3 and the raceway rail 1 can be reduced as compared with that in the example shown in FIG. 5. In addition, the balls 3 advance within the non-load ball grooves 14 at a high speed of 1.5 V, so dynamic pressure acts on the oil films adhering to the non-load ball grooves 14 and the pressure of the oil films is enhanced, whereby it is possible to prevent the balls 3 and the raceway rail 1 from coming into solid contact with each other. Further, while the balls 3 within the non-load rolling paths advance at a speed of 1.5 V with respect to the raceway rail 1, they advance at a speed of 0.5 V with respect to the movement block 2, thus causing a difference in speed to exist between the wall surfaces on both sides of the balls 3, so, due to the viscous drag of the lubricating oil, the balls 3 advance through the non-load rolling paths while gently rotating, and stable oil films are also formed between the balls 3 and the movement block 2. In this case, the central positions of the balls 3 are determined according to the thickness of the oil film on the movement block 2 side and the thickness of the oil film on the raceway rail 1 side, and the oil film on the raceway rail 1 side, where the relative speed difference is large, is somewhat thicker than the oil film on the movement block 2 side, so the balls 3 are retained at positions somewhat closer to the movement block 2 side than to the raceway rail 1 side, and advance within the non-load rolling paths in a stable state.

That is, by thus forming the track grooves 21 in the movement block 2 to form the endless circulation paths for the balls 3, the non-load rolling paths for the balls 3 are formed by the non-load ball grooves 14 on the raceway rail 1 side and the non-load straight-line grooves 23 on the movement block 2 side, which are opposed to each other, whereby it is possible to smoothly lubricate the balls 3 advancing through the non-load rolling paths.

Figure 6:
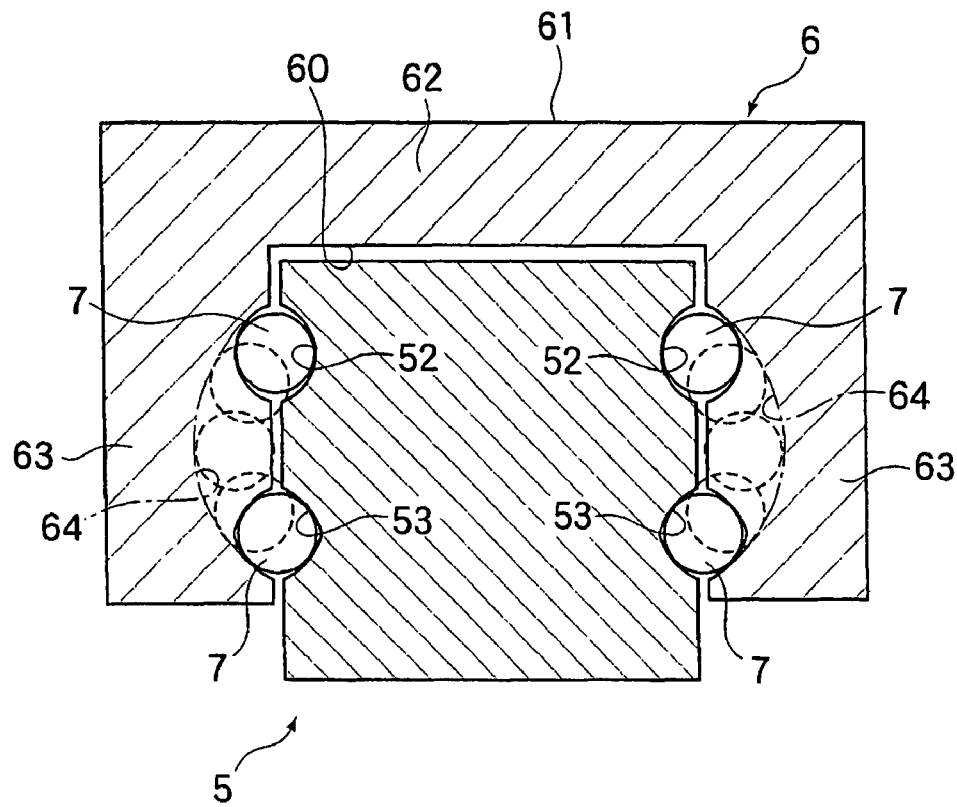
FIG. 6 is a front sectional view of a second embodiment of a rolling guiding device to which the present invention is applicable.

FIG. 6 is a front sectional view of another example of a rolling guiding device to which the present invention is applied. In the example shown in FIG. 6, a raceway rail 5 has a substantially rectangular sectional configuration taken along a direction orthogonal to the longitudinal direction thereof, and ball rolling grooves 51 and non-load ball grooves 52 are respectively formed in a pair of outer side surfaces directed in opposite directions. A movement block 6 is formed in a saddle-like configuration and has an engagement groove 60 to be loosely engaged with a part of the raceway rail 5; it has a top plate portion 62 equipped with a mounting surface 61 for a movable member and a pair of skirt portions 63 and 63 extending vertically downwards from both sides of the top plate portion 62. The inner side surfaces of the skirt portions 63 are opposed to the outer side surfaces of the raceway rail 5 through the intermediation of slight gaps, and track grooves 64 that are the same as those of the first embodiment are formed in the inner side surfaces of the skirt portions 63. In the track grooves 64, there are arranged a large number of balls 7, which circulate through the track grooves 64, whereby the movement block 6 can move continuously along the raceway rail 5.

Figure 7:
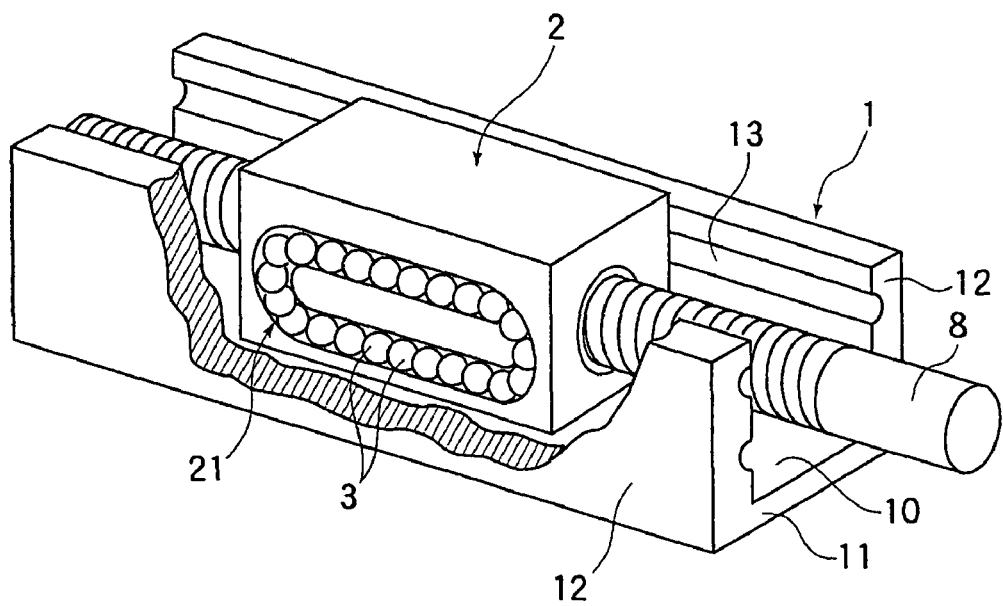
FIG. 7 is a partially cutaway perspective view of an example of a construction in which a screw shaft is threadedly engaged with the movement block of the guiding device of the first embodiment to form a linear actuator.

FIG. 7 shows an example in which there is constructed a linear actuator in which a screw shaft 8 is threadedly engaged with the movement block 2 of the rolling guiding device of the first embodiment shown in FIGS. 1 through 4 and in which the movement block 2 advances and retreats within the accommodation groove 10 of the raceway rail 1 through rotation of the screw shaft 8. As described above, the endless circulation paths for the balls 3 in the movement block 2 are formed by the track grooves 21, so the movement block 2 can have a large diameter through-hole to be threadedly engaged with the screw shaft 8, thus making it possible to threadedly engage the screw shaft 8, which is of a relatively large diameter, with the movement block 2 while achieving a reduction in the size of the movement block 2. As a result, it is possible to enhance the rotating speed of the screw shaft 8 while elongating the same, and at the same time, to impart a large thrust to the movement block 2, thus making it possible to provide a linear actuator of high speed and long stroke.

The invention claimed is:

1. A rolling guiding device, comprising:
    a raceway rail;
    a plurality of balls; and
    a movement block assembled to the raceway rail through an intermediation of the balls, wherein
    in at least one surface of the raceway rail opposed to the movement block, there is formed a ball rolling groove extending in the longitudinal direction of the raceway rail, and in one surface of the movement block opposed to the rolling groove, there is formed a track groove through which the balls make an endless circulation,
    the track groove comprises a load straight-line groove which allows, between the track groove and the rolling groove of the raceway rail, the balls to roll along while bearing a load; a pair of ball deflection grooves respectively provided at both ends of the load straight-line groove and adapted to release the balls having rolled through the load straight-line groove from the load and to change their rolling direction, causing the balls to leave the rolling groove of the raceway rail; and a non-load straight-line groove for transferring the balls in a non-load state from one ball deflection groove to the other ball deflection groove, and
    the non-load straight-line groove of the movement block is opposed to the raceway rail so that the balls are retained in the non-load straight-line groove.

2. A rolling guiding device according to claim 1, characterized in that the non-load straight-line groove of the movement block is formed in a sectional configuration whose curvature is slightly smaller than that of the surfaces of the balls.

3. A rolling guiding device according to claim 1, characterized in that the track groove of the movement block is formed in the same sectional configuration over the entire periphery of the track groove, and
    that the load straight-line groove, the ball deflection grooves, and the non-load straight-line groove differ from each other in depth.

4. A rolling guiding device according to claim 1, characterized in that the raceway rail has a non-load ball groove formed to be flush with and parallel to the rolling groove through the intermediation of a flat portion, and
    that the non-load ball groove is opposed to the non-load straight-line groove formed in the movement block.

5. A rolling guiding device according to claim 4, characterized in that the load straight-line groove and the non-load straight-line groove formed in the movement block are formed substantially in the same depth.

6. A rolling guiding device according to claim 1, characterized in that the non-load straight-line groove is formed in the same depth as deepest portions of the ball deflection grooves.

7. A rolling guiding device according to claim 1, characterized in that the raceway rail is formed in a channel-like configuration to have an accommodation groove continuously extending in the longitudinal direction, with the movement block being formed in a rectangular configuration so that the movement block is loosely fitted into the accommodation groove of the raceway rail, and that the raceway rail has the ball rolling grooves formed in inner side surfaces of a pair of flange portions opposed to each other through the intermediation of the accommodation groove, with the movement block having the track groove in each of a pair of side surfaces opposed to the flange portions of the raceway rail.

8. A rolling guiding device according to claim 1, characterized in that the raceway rail is formed in a substantially rectangular sectional configuration as taken along a plane orthogonal to the longitudinal direction of the raceway rail, with the movement block being formed in a saddle-like configuration having an engagement groove into which a part of the raceway rail is to be loosely fitted, and that the ball rolling grooves are formed in both side surfaces of the raceway rail, with the movement block having the track groove in each of inner side surfaces of a pair of skirt portions opposed to the side surfaces of the raceway rail.

9. A method of manufacturing a rolling guiding device according to claim 1, characterized in that the movement block is formed by casting of an amorphous metal using a die, with the track groove being formed simultaneously with the casting.

10. A method of manufacturing a rolling guiding device according to claim 1, characterized in that the movement block is formed by metal injection molding using a die, with the track groove being formed simultaneously with the metal injection molding.

* * * * *